United States Patent
Tsujii et al.

(10) Patent No.: US 7,510,039 B2
(45) Date of Patent: Mar. 31, 2009

(54) VEHICLE WITH FRONT AND REAR FRAMES AND SHOCK ABSORBING MEMBER

(75) Inventors: Eiichiro Tsujii, Shizuoka (JP); Takaya Koitabashi, Shizuoka (JP); Tetsuya Kimura, Shizuoka (JP); Hitoshi Watanabe, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 438 days.

(21) Appl. No.: 11/302,947

(22) Filed: Dec. 13, 2005

(65) Prior Publication Data

US 2006/0131092 A1 Jun. 22, 2006

(30) Foreign Application Priority Data

Dec. 16, 2004 (JP) .............................. 2004-364244

(51) Int. Cl.
*B62D 61/02* (2006.01)
(52) U.S. Cl. .................... 180/219; 180/227; 280/283
(58) Field of Classification Search ................ 180/219, 180/227; 280/283, 272, 279

See application file for complete search history.

(56) References Cited

U.S. PATENT DOCUMENTS

| 3,938,609 A | | 2/1976 | Kensaku et al. |
| 4,159,752 A | * | 7/1979 | Kanno ......................... 180/210 |
| 4,702,340 A | * | 10/1987 | Hamilton .................... 180/224 |
| 4,984,650 A | | 1/1991 | Horiike et al. |
| 7,364,010 B2 | * | 4/2008 | Konno ......................... 181/228 |
| 2002/0053478 A1 | * | 5/2002 | Laimbock ................... 180/219 |
| 2005/0133283 A1 | * | 6/2005 | Horii .......................... 180/65.1 |
| 2006/0113745 A1 | * | 6/2006 | Lagar .......................... 280/279 |

FOREIGN PATENT DOCUMENTS

| DE | 3029373 A1 | 2/1976 |
| JP | 63-222987 | 9/1988 |

* cited by examiner

*Primary Examiner*—Paul N Dickson
*Assistant Examiner*—Maurice Williams
(74) *Attorney, Agent, or Firm*—Hogan & Hartson LLP

(57) ABSTRACT

The present invention provides for a vehicle, such as a motorcycle, that is capable of sufficiently absorbing shock applied in the vehicle width direction due to uneven terrain, such as bumps and potholes, on the ground or road during turns. The vehicle, such as the motorcycle, includes a head pipe for supporting a front wheel, a main frame for supporting a rear wheel to which the head pipe is attached for rotation about a torsion axis of a shaft part extending longitudinally, and a torsion spring for absorbing shock as the head pipe rotates with respect to the main frame.

18 Claims, 13 Drawing Sheets

VEHICLE WITH FRONT AND REAR FRAMES AND SHOCK ABSORBING MEMBER

BACKGROUND OF THE INVENTION

1. Field of the Invention

The present invention relates to a vehicle and, in particular, to a vehicle provided with a front frame for supporting a front wheel and a rear frame for supporting a rear wheel.

2. Description of Related Art

Some vehicles, such as motorcycles, are provided with a front frame for supporting a front wheel and a rear frame for supporting a rear wheel. Conventional motorcycles are provided with front forks that absorb shock in the vertical direction. The front forks are installed in part of the front frame for supporting the front wheel. With this structure, the front forks can absorb shock in the vertical direction when the front wheel encounters shock in the vertical direction due to bumps or potholes on the ground while the vehicle is running straight ahead with the front wheel not inclined.

With the front forks in the conventional motorcycles as described above, shock applied to the front wheel in the vehicle's vertical direction can be absorbed. However, it is difficult to absorb shock applied thereto in the vehicle width direction. Thus, with conventional front forks, it can be difficult to absorb shock when the front wheel encounters shock in the vehicle width direction due to bumps or potholes on the ground during a turn with the vehicle body (front wheel) inclined,.

On the other hand, another type of conventional motorcycle has been proposed in which the front frame for supporting the front wheel is rotatable with respect to the rear frame for supporting the rear wheel (see JP-A-Sho 63-222987, for example). In JP-A-Sho 63-222987, shock in the vehicle width direction can be mitigated to some degree when shock in the vehicle width direction due to bumps or potholes on the ground is applied to the front wheel during a turn with the vehicle body (front wheel) inclined,.

However, in the structure proposed in JP-A-Sho 63-222987 when shock in the vehicle width direction is applied to the front wheel, the front wheel only moves in the direction in which the shock has been applied (the vehicle width direction) to absorb the shock. That is, the shock in the vehicle width direction is not actively absorbed, and it is still difficult to sufficiently absorb the shock in the vehicle width direction.

SUMMARY OF THE INVENTION

The present invention solves the foregoing problem by way of providing a vehicle, such as a motorcycle, capable of sufficiently absorbing shock applied in the vehicle width direction due to uneven terrain, such as bumps and potholes, on the ground or on a road during turns.

In one aspect, the present invention provides for a vehicle having a front frame for supporting a front wheel, a rear frame for supporting a rear wheel to which the front frame is attached for rotation about an axis extending longitudinally, and a shock absorbing member for absorbing shock as the front frame rotates with respect to the rear frame.

The vehicle, according to this aspect, is provided with the rear frame to which the front frame is attached for rotation about the axis extending longitudinally, and the shock absorbing member for absorbing shock as the front frame rotates with respect to the rear frame. Thus, the front frame can be rotated with respect to the rear frame such that the front wheel moves in the vehicle width direction to conform to bumps and potholes on the ground during turns with the vehicle body inclined, and the shock absorbing member can actively absorb shock in the vehicle width direction (lateral direction) during such rotations. As a result, shock applied in the vehicle width direction (lateral direction) due to bumps and potholes on the ground can be sufficiently absorbed.

In the vehicle according to the aspect as described above, the shock absorbing member preferably includes a torsion spring disposed between the front frame and the rear frame and on the axis extending longitudinally. With this structure, when the front frame rotates with respect to the rear frame, the torsion spring can sufficiently absorb shock in the rotating direction (the vehicle width direction) with its torsion force.

In the vehicle whose shock absorbing member includes a torsion spring as described above, preferably a front part of the torsion spring is secured to the front frame, and a rear part of the torsion spring is secured to the rear frame. With this structure, when the front frame rotates with respect to the rear frame, the torsion spring can sufficiently absorb shock easily with its torsion force.

In the vehicle whose shock absorbing member includes a torsion spring as described above, preferably the torsion spring is unloaded when the front wheel and the rear wheel are in an identical plane, and the torsion spring is loaded to absorb shock with its torsion force when the front frame and the rear frame are in different planes with the front frame rotated with respect to the rear frame. With this structure, when the front frame and the rear frame are in different planes with the front frame rotated with respect to the rear frame, the torsion spring can sufficiently absorb shock easily with its torsion force.

Preferably, the vehicle according to the aspect as described above further includes damping means for damping rotation of the front frame with respect to the rear frame. With this structure, when the front frame rotates with respect to the rear frame and the shock absorbing member absorbs shock, the damping member can damp vibration of the shock absorbing member constituted of the torsion spring or the like. This structure can converge the vibration in an improved way as the shock absorbing member absorbs shock.

In the vehicle according to the aspect as described above, an extension line of the axis extending longitudinally preferably passes near a contact point between the rear wheel and the ground. With this structure, when the front frame rotates with respect to the rear frame, the rear wheel rotates about the vicinity of the contact point between the rear wheel and the ground, thereby inhibiting the rear wheel from skidding with respect to the ground.

Preferably, the vehicle according to the aspect as described above further includes a bearing for supporting the front frame and the rear frame for rotation with respect to each other, the bearing being disposed between the front frame and the rear frame. With this structure, the bearing allows the front frame to be smoothly rotated with respect to the rear frame about the axis extending longitudinally.

In the vehicle including the bearing as described above, the bearing is preferably an angular bearing. The angular bearing can assure the rigidity of the part, where the front frame and the rear frame are coupled, both in the direction along the axis extending longitudinally (thrust direction) and in the direction perpendicular to the axis extending longitudinally (radial direction).

In the vehicle whose bearing is an angular bearing as described above, preferably the front frame includes a head pipe, the head pipe includes a first projective bearing attachment part formed to project rearward from the head pipe, the first projective bearing attachment part having a rotation center on the axis extending longitudinally and an outer circumferential surface to which the angular bearing is attached, and the rear frame includes a second recessed bearing attachment part that is disposed to oppose the first projective bearing attachment part of the head pipe and that has an inner circumferential surface to which the angular bearing is attached. With this structure, the front frame can be rotated with respect to the rear frame more easily by means of the angular bearing attached at the first bearing attachment part of the head pipe and the second bearing attachment part of the rear frame.

In the vehicle according to the aspect as described above, its weighted center is preferably positioned anywhere other than on the extension line of the axis extending longitudinally. With this structure, the front frame can be rotated with respect to the rear frame easily by inclining the vehicle body during turns, since a moment about the axis extending longitudinally occurs due to the weighted center. Consequently, the rear wheel can be easily inclined during turns.

In the vehicle according to the aspect as described above, the axis extending longitudinally preferably extends rearward and downward of the front frame. With this structure, when the vehicle with the weighted center of the rider and vehicle positioned above the axis extending longitudinally is inclined leftward with respect to the vertical direction to make a left turn, for example, the rear wheel is inclined about the axis extending downward and rearward (obliquely downward to the rear). Hence, the front side of the rear wheel moves rightward slightly more than the rear side thereof. This can reduce the turning radius, thereby improving the turning characteristics.

Preferably, the vehicle according to the aspect as described above further includes a restricting member for restricting rotation of the front frame with respect to the rear frame. This structure can prevent the front frame from rotating excessively with respect to the rear frame.

Preferably, the vehicle according to the aspect as described above further includes a front light disposed forward of the front frame, and the front light is secured to the rear frame. This structure prevents the front light from rotating with respect to the rear frame and, thus, allows it to cast light forward of the vehicle body, even when the front frame rotates with respect to the rear frame.

In the vehicle according to the aspect as described above, preferably an engine is mounted to the rear frame for supporting the rear wheel, and the rear wheel can be inclined together with the rear frame and the engine with respect to a vertical direction during a turn. With this structure, since the rear wheel is inclined together with the engine which is heavy, the weighted center of the vehicle body can be moved leftward and rightward (in the vehicle width direction) with respect to the moving direction easily by inclining the rear wheel. This can improve the turning characteristics of the vehicle.

DETAILED DESCRIPTION OF THE INVENTION

An embodiment of the present invention is described below with reference to the accompanying drawings.

Figure 1:
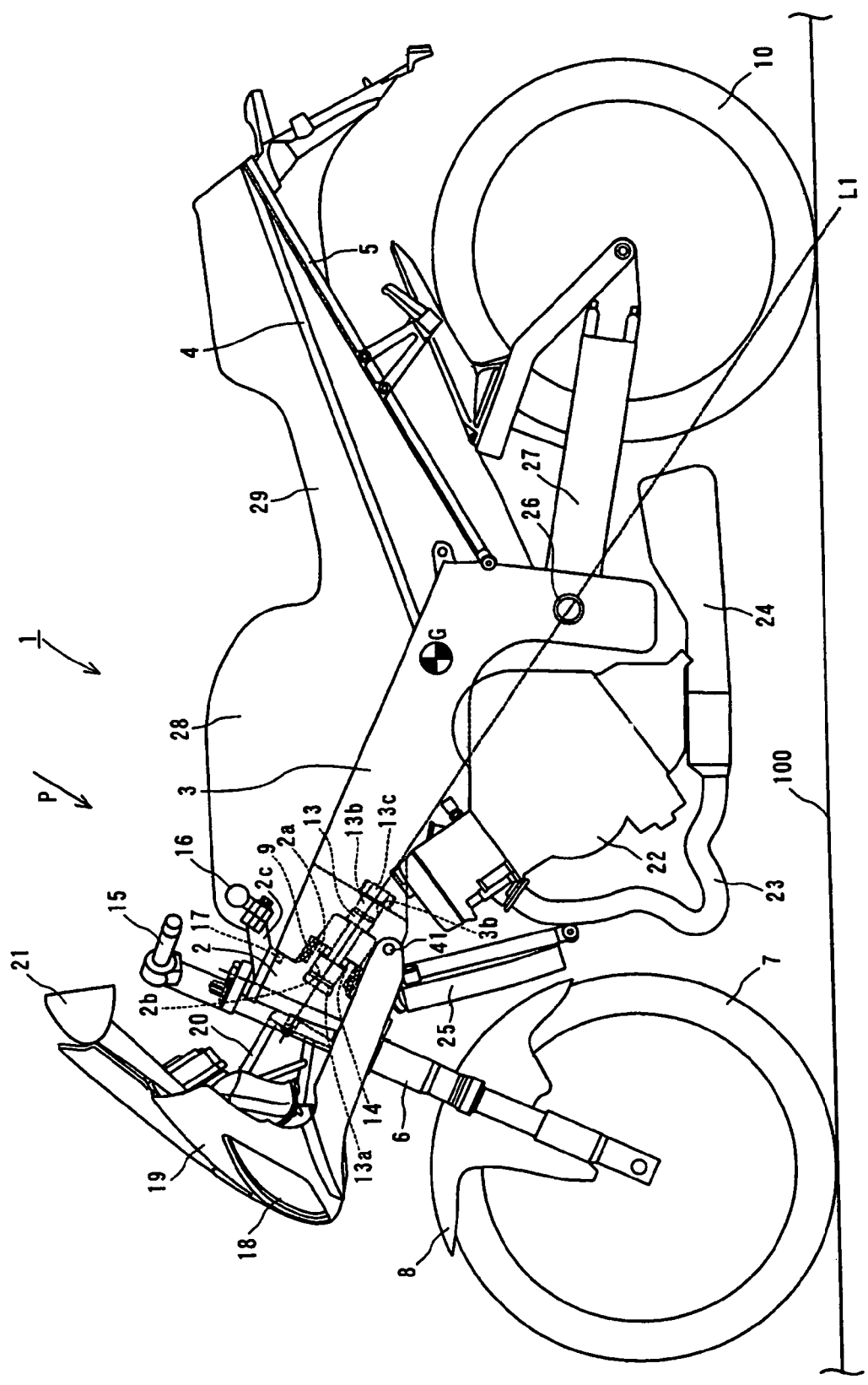
FIG. 1 is a side view showing the entire structure of a motorcycle according to an embodiment of the present invention.
Figure 2:
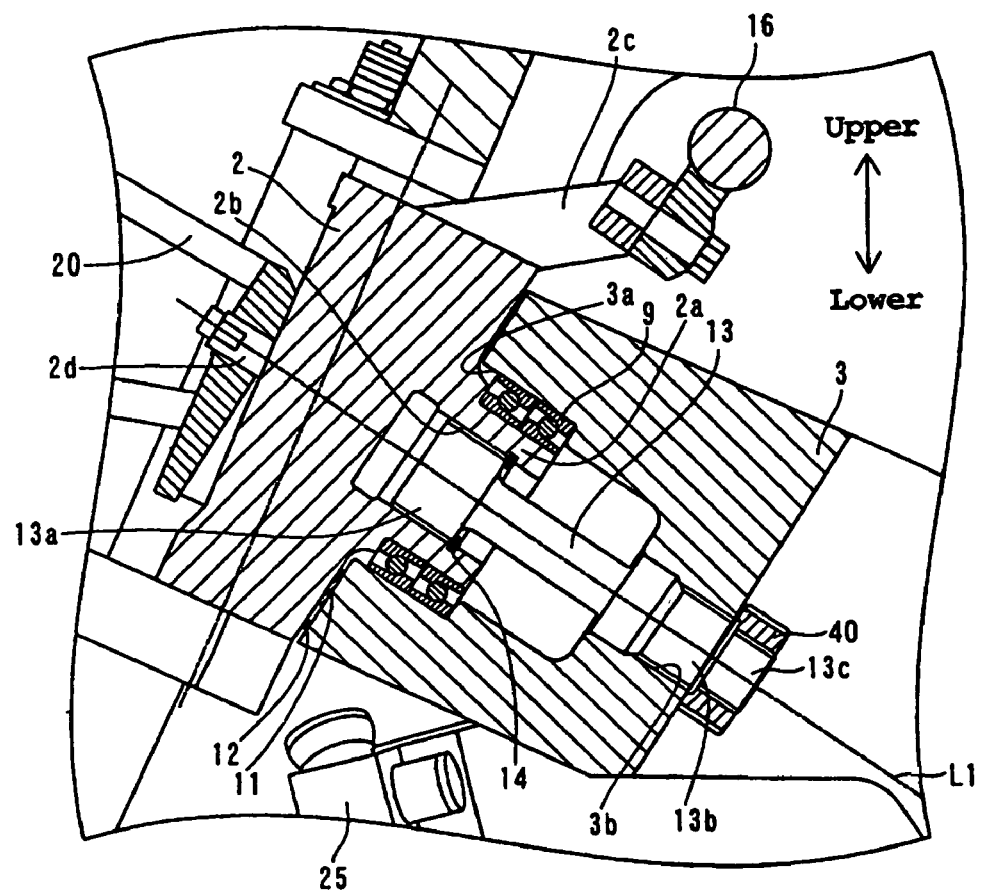
FIG. 2 is a sectional view showing the vicinity of a head pipe of the motorcycle according to the embodiment shown in FIG. 1.
Figure 3:
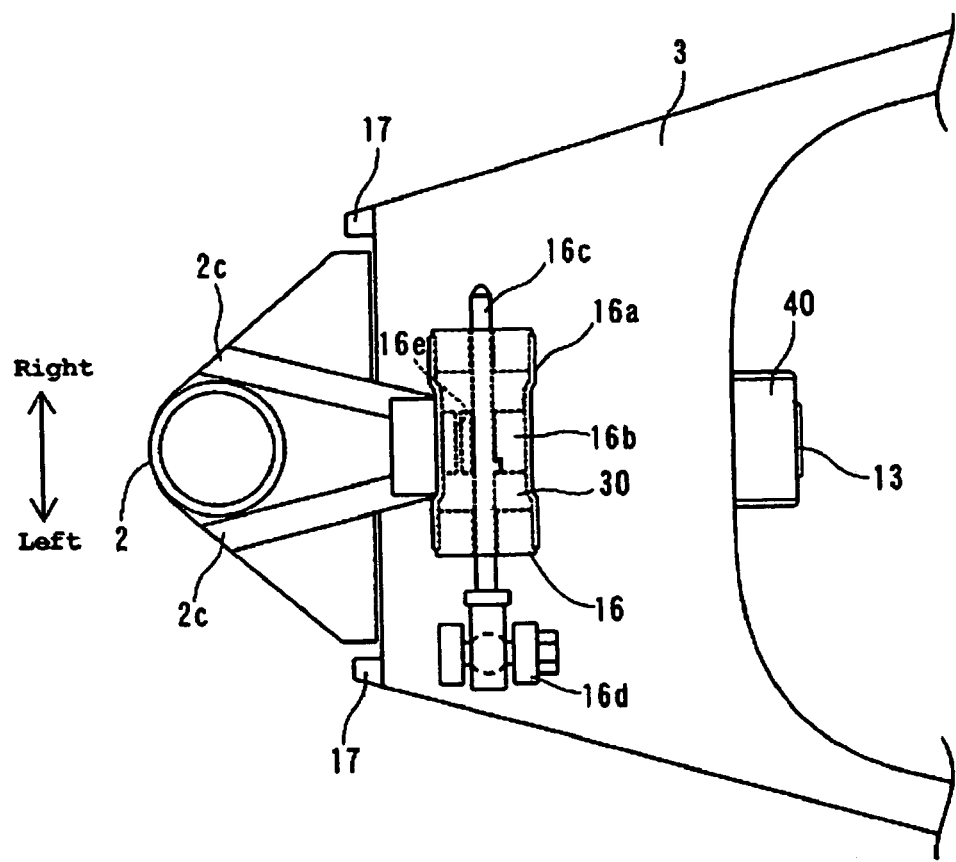
FIG. 3 is a view as seen from the direction of the arrow P of FIG. 1.
Figure 4:
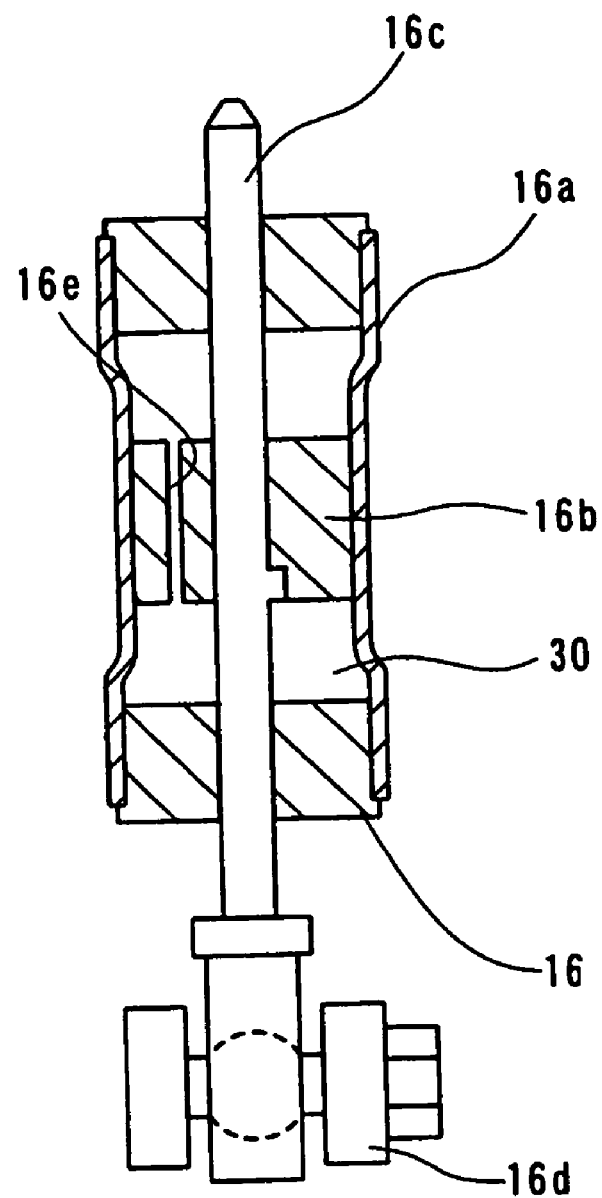
FIG. 4 is a sectional view of a damper of the motorcycle according to the embodiment shown in FIG. 1.

FIG. 1 is a side view showing the entire structure of a motorcycle according to an embodiment of the present invention. FIG. 2 is a sectional view showing the vicinity of a head pipe of the motorcycle according to the embodiment shown in FIG. 1. FIGS. 3 and 4 illustrate the detailed structure of the motorcycle according to the embodiment shown in FIG. 1. In this embodiment, for example, a motorcycle is taken as an example of the vehicle of the present invention. With reference to FIGS. 1 through 4, the detailed structure of the motorcycle according to the embodiment of the present invention is described as follows.

As shown in FIG. 1, a motorcycle 1 of the embodiment of the present invention is provided with a head pipe 2 and a main frame 3 disposed rearward of the head pipe 2. The head pipe 2 is an example of the "front frame" of the present invention, and the main frame 3 is an example of the "rear frame" of the present invention. The main frame 3 is formed to extend downward and rearward. A seat rail 4 is connected to the main frame 3. A backstay 5 is connected between the rear part of the main frame 3 and the rear end of the seat rail 4. The head pipe 2, the main frame 3, the seat rail 4, and the backstay 5 constitute a vehicle body frame.

A pair of front forks 6 having a suspension for absorbing vertical shock are disposed below the head pipe 2. A front wheel 7 is rotatably mounted at the lower ends of the pair of front forks 6. A front fender 8 is disposed above the front wheel 7 to cover it.

In this embodiment, as shown in FIG. 2, the rear part of the head pipe 2 is formed integrally with a cylindrical shaft part 2a which projects downward and rearward. The shaft part 2a is an example of the "first bearing attachment part" of the present invention. Also, the main frame 3 is provided with a recessed shaft insertion part 3a for receiving the shaft part 2a of the head pipe 2. The shaft insertion part 3a is an example of the "second bearing attachment part" of the present invention.

An angular bearing 9 is disposed between the outer circumferential surface of the shaft part 2a of the head pipe 2 and the inner circumferential surface of the shaft insertion part 3a of the main frame 3. This structure allows the head pipe 2 to rotate with respect to the main frame 3 about a torsion axis L1 extending longitudinally of the shaft part 2a. The torsion axis L1 of the shaft part 2a of the head pipe 2 is an example of the "axis" of the present invention. The angular bearing 9 is an example of the "bearing" of the present invention. The angular bearing 9 is disposed with its center axis substantially coaxial with the torsion axis L1 extending longitudinally of the shaft part 2a of the head pipe 2. The extension line of the torsion axis L1 extending longitudinally extends rearward and downward (obliquely downward to the rear) and passes near the contact point between a rear wheel 10 and the ground 100. With a rider not on the vehicle, the weighted center G (see FIG. 1) of the motorcycle 1 is positioned above the extension line of the torsion axis L1. As shown in FIG. 2, a thrust washer 11 and a rubber dust seal 12 are disposed between the head pipe 2 and the front part of the main frame 3. The dust seal 12 prevents dust and the like from intruding toward the thrust washer 11 and the angular bearing 9 through the gap between the head pipe 2 and the front part of the main frame 3.

In this embodiment, as shown in FIG. 2, the head pipe 2 and the main frame 3 are coupled via a torsion spring 13 with a shock absorbing function. The torsion spring 13 is an example of the "shock absorbing member" of the present invention. The torsion spring 13 is attached as follows. A spline hole 2b with a groove is formed in the shaft part 2a of the head pipe 2. A spline shaft part 13a at the front part of the torsion spring 13 is inserted in the spline hole 2b. The spline shaft part 13a of the torsion spring 13 is splined to conform to the groove of the spline hole 2b. This structure secures the front part of the torsion spring 13 so as to rotate together with the shaft part 2a of the head pipe 2. A C-ring 14 for preventing the torsion spring 13 from coming off rearward is fitted in the rear of the spline hole 2b of the head pipe 2. Also, a spline hole 3b with a groove is formed in part of the main frame 3 where the torsion spring 13 is attached. A spline shaft part 13b at the rear part of the torsion spring 13 is inserted in the spline hole 3b. The spline shaft part 13b of the torsion spring 13 is splined to conform to the groove of the spline hole 3b. This structure secures the rear part of the torsion spring 13 so as to rotate together with the main frame 3. The rear end of the torsion spring 13 is formed with a screw part 13c. The screw part 13c of the torsion spring 13 is secured to the inner front surface of the main frame 3 through a nut 40. When the front wheel 7 and the rear wheel 10 are in an identical plane, the torsion spring 13 is unloaded (the torsion angle is 0 degrees). When the front wheel 7 and the rear wheel 10 are not in an identical plane with the head pipe 2 rotated with respect to the main frame 3, the torsion spring 13 is loaded. The torsional rigidity is adjustable by exchanging the torsion spring 13.

As shown in FIG. 1, handlebars 15 are rotatably attached to the head pipe 2.

In this embodiment, as shown in FIGS. 2 and 3, the upper part of the head pipe 2 is formed integrally with a damper support part 2c extending obliquely rearward and upward. A cylinder type (hydraulic cylinder type) damper 16 for damping vibration of the torsion spring 13 as the head pipe 2 rotates with respect to the main frame 3 is attached to the upper part of the damper support part 2c. The damper 16 is an example of the "damping means" of the present invention. As shown in FIGS. 3 and 4, the damper 16 includes a tank part 16a, a piston 16b disposed within the tank part 16a, a piston shaft 16c secured to the piston 16b, and a piston shaft support part 16d for supporting an end of the piston shaft 16c. The tank part 16a is secured to the damper support part 2c. Also, the tank part 16a is filled with oil 30. The piston 16b is provided with an orifice 16e for allowing the oil 30 to pass therethrough. The piston shaft 16c is disposed to penetrate through the tank part 16a. The piston shaft support part 16d is secured to the upper surface of the main frame 3, as shown in FIG. 3. Also, the piston shaft support part 16d is ball-jointed to the end of the piston shaft 16c. This structure allows the piston shaft 16c, inserted in the tank part 16a, to move left and right with respect to the piston shaft support part 16d as the tank part 16a rotates in an arc about the torsion axis L1 (see FIG. 2) of the angular bearing 9. As a result, the arcuate rotational movement is converted to linear movement, allowing the piston shaft 16c and the piston 16b to move smoothly in the tank part 16a. In the damper 16 described above, when the head pipe 2 rotates with respect to the main frame 3 about the torsion axis L1 (see FIG. 2) of the angular bearing 9, the tank part 16a rotates and the piston 16b moves in the tank part 16a along with the rotation of the head pipe 2. At this time, viscous drag occurs as the oil 30 passes through the orifice 16e of the piston 16b, which can damp vibration of the torsion spring 13 while absorbing shock.

In this embodiment, as shown in FIG. 3, the front area of the main frame 3 is provided with a pair of stoppers 17 for preventing the head pipe 2 from rotating excessively with respect to the main frame 3. The stoppers 17 are an example of the "restricting member" of the present invention. The pair of stoppers 17 are formed to contact the head pipe 2 when the head pipe 2 rotates clockwise or counterclockwise by several degrees with respect to the main frame 3 about the torsion axis L1.

As shown in FIG. 1, the front area of the head pipe 2 is provided with a headlight 18 for casting light forward and a front cowl 19 for covering the front area of the head pipe 2. The headlight 18 is an example of the "front light" of the present invention. A light stay 20 for supporting the headlight 18 is disposed between the headlight 18 and the head pipe 2. Instruments and rear view mirrors 21 are attached to the upper side of the light stay 20.

In this embodiment, as shown in FIG. 2, the light stay 20 is secured to the main frame 3, and also supported by the support part 2d of-the head pipe 2 so as to be rotatable with respect to the head pipe 2 about the torsion axis L1 of the shaft part 2a of the head pipe 2. This structure prevents the headlight 18 from rotating with respect to the main frame 3 and, thus, allows the headlight 18 to cast light forward of the vehicle body (main frame 3), even when the head pipe 2 rotates with respect to the main frame 3. As shown in FIG. 1, the lower part of the front cowl 19 extends rearward and downward and is secured to a body cover (not shown) of the main frame 3 by a screw 41.

An engine 22 is mounted below the main frame 3. An exhaust pipe 23 is attached to the engine 22. The exhaust pipe 23 curves rightward with respect to the running direction and extends rearward and downward, and is connected to a muffler 24. A radiator 25 for cooling the engine 22 is provided forward and upward of the engine 22.

A pivot shaft 26 is provided at the rear end of the main frame 3. The pivot shaft 26 journals the front end of a rear arm 27 such that the rear arm 27 can pivot up and down. The rear wheel 10 is rotatably mounted at the rear end of the rear arm 27. That is, the rear wheel 10 is mounted to the main frame 3 via the rear arm 27. The rear wheel 10 is constituted of a so-called round tire with its lower surface formed in an arc as viewed from the direction in which the vehicle moves, so that the rear wheel 10 can be inclined with respect to the vertical direction during turns. As with the rear tire 10, the front wheel 7 is also constituted of a round tire. A fuel tank 28 is disposed on the upper side of the main frame 3. A seat 29 is disposed rearward of the fuel tank 28.

FIGS. 5 through 9 illustrate the operation during a turn of the motorcycle according to the embodiment shown in FIG. 1, in which operation the head pipe rotates with respect to the main frame. FIG. 10 illustrates the operation of a conventional motorcycle corresponding to FIG. 8, as a comparative example of the embodiment shown in FIG. 1. Now, with reference to FIGS. 2 and 5 through 10, description is made of the operation during a turn of the motorcycle according to the embodiment of the present invention and another operation during a turn of the motorcycle according to the comparative example.

Figure 5:
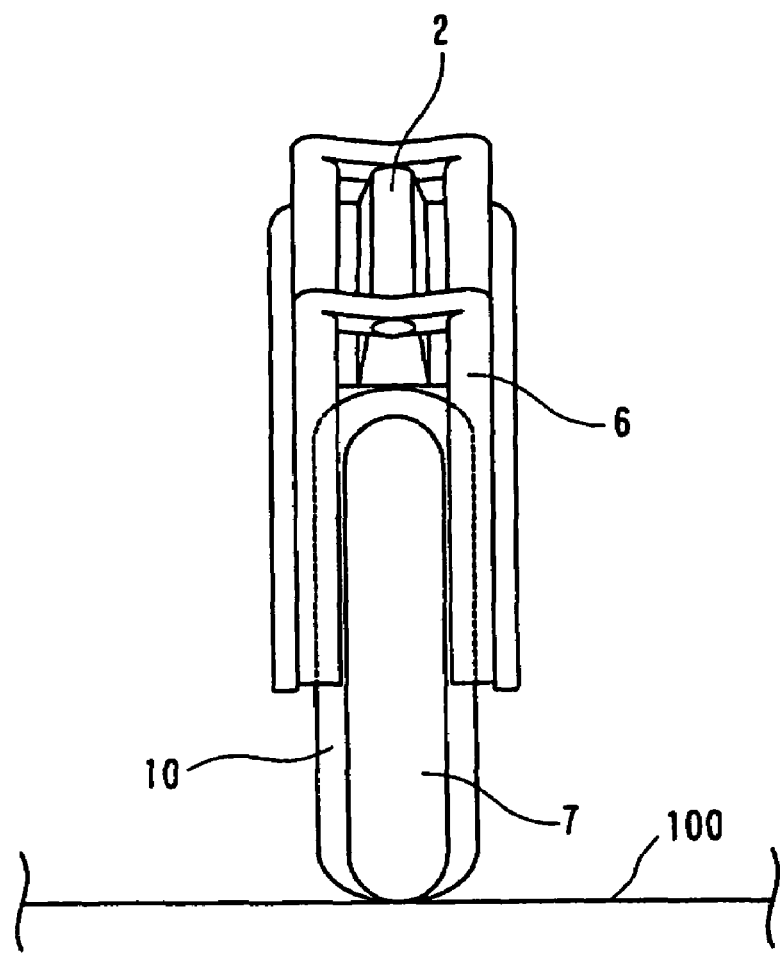
FIG. 5 illustrates the operation during a turn of the motorcycle according to the embodiment shown in FIG. 1, in which operation the head pipe rotates with respect to a main frame.
Figure 6:
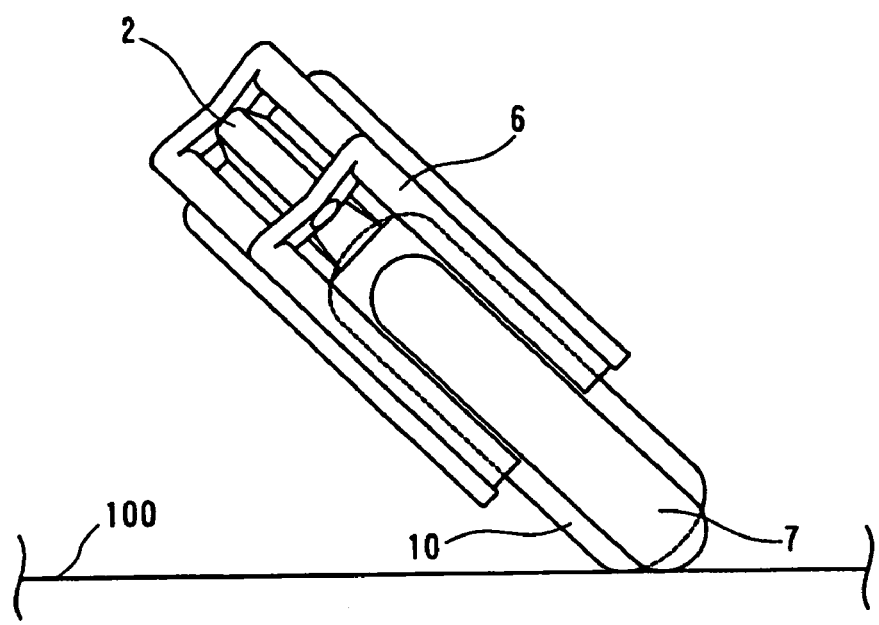
FIG. 6 illustrates the operation during a turn of the motorcycle according to the embodiment shown in FIG. 1, in which operation the head pipe rotates with respect to the main frame.
Figure 7:
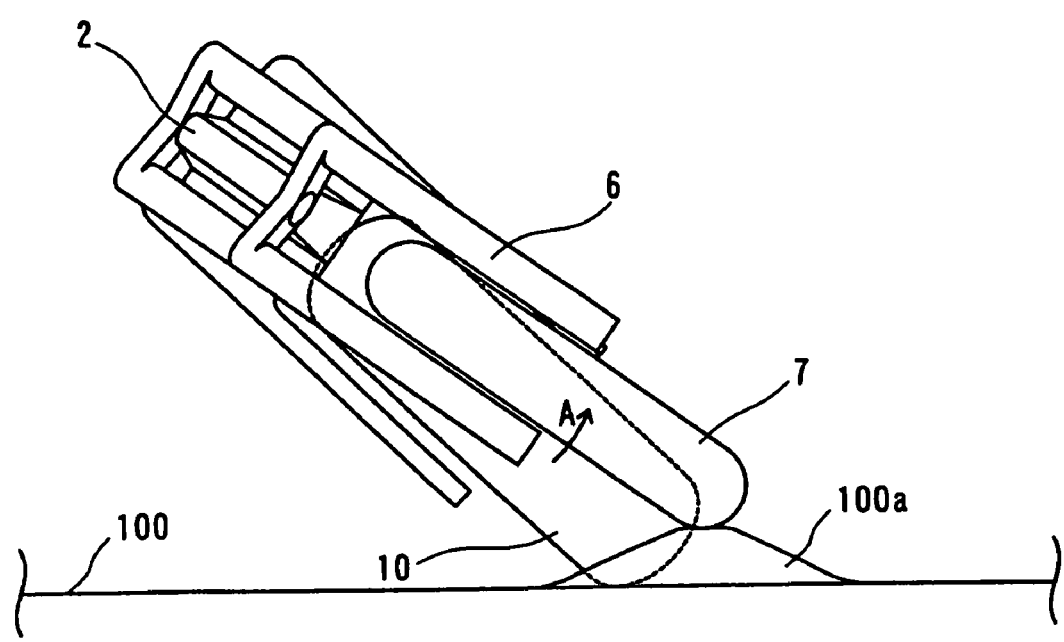
FIG. 7 illustrates the operation during a turn of the motorcycle according to the embodiment shown in FIG. 1, in which operation the head pipe rotates with respect to the main frame.

When the motorcycle 1, according to this embodiment, is about to make a turn, the vehicle body of FIG. 5 is inclined toward the turning direction with respect to the vertical direction, as shown in FIG. 6. In this embodiment, in the case where there is a bump 100a on the ground 100 as shown in FIG. 7, the head pipe 2 attached to the front wheel 7 rotates with respect to the main frame 3 such that the front wheel 7 moves in the direction of conforming to the bump 100a on the ground 100 (the direction of the arrow A). In this case, the torsion spring 13 is subjected to torsion and absorbs shock in the direction of conforming to the bump 100a (the direction of the arrow A).

Figure 8:
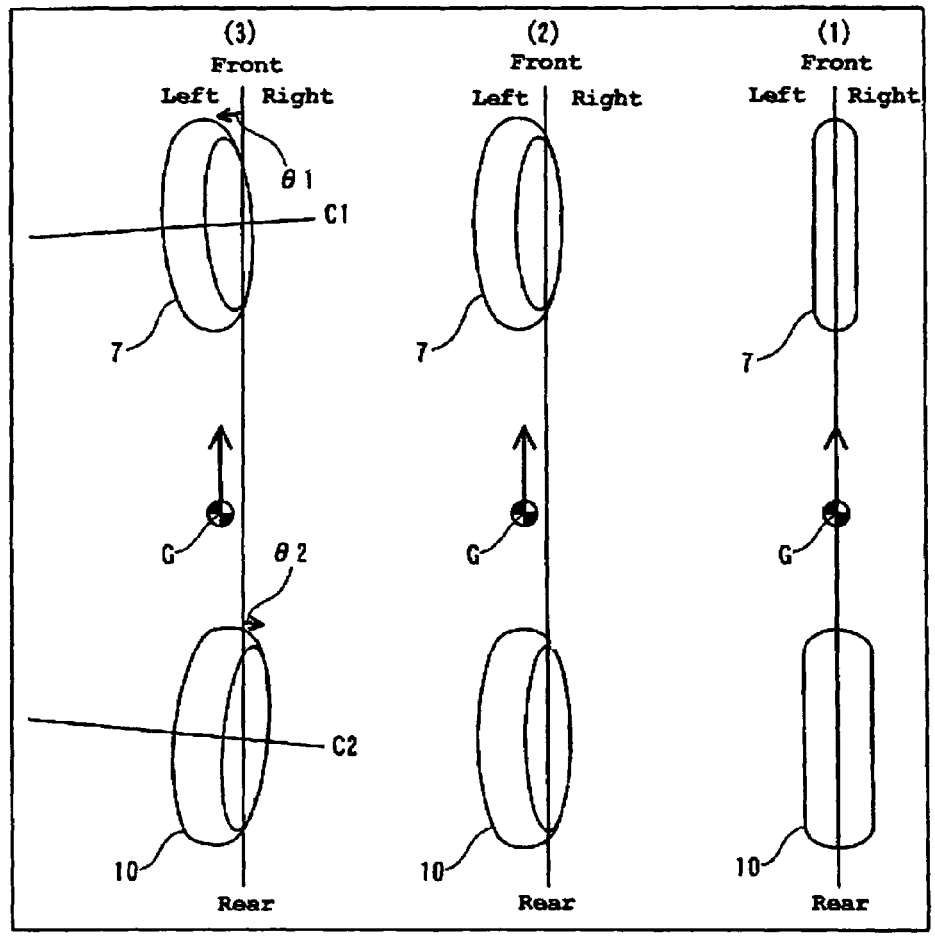
FIG. 8 illustrates the operation during a turn of the motorcycle according to the embodiment shown in FIG. 1, in which operation the head pipe rotates with respect to the main frame.
Figure 9:
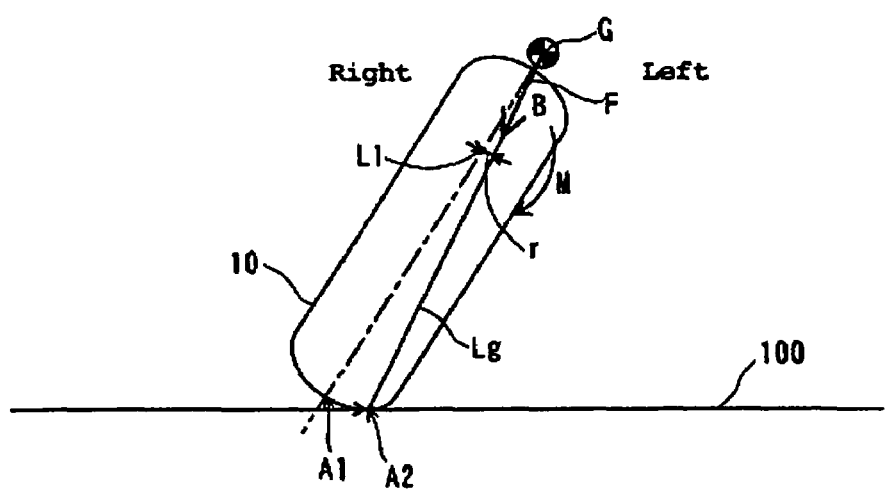
FIG. 9 is a front view of a rear wheel of the motorcycle according to the embodiment shown in FIG. 8(2).
Figure 10:
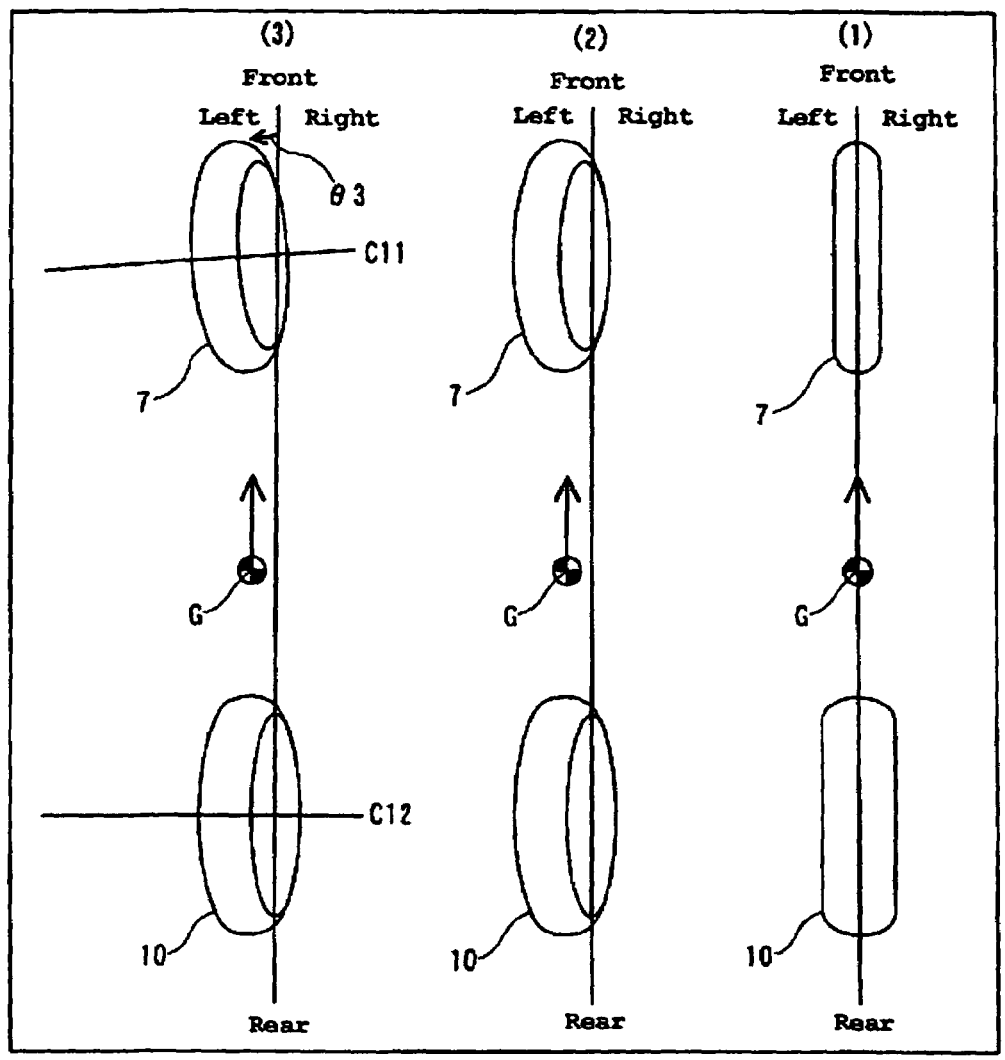
FIG. 10 illustrates the operation of a conventional motorcycle corresponding to FIG. 8, as a comparative example of the embodiment shown in FIG. 1.

When the motorcycle 1 according to this embodiment is about to make a left turn, for example, the vehicle body shown in FIG. 8(1) is inclined leftward with respect to the vertical direction, resulting in the front wheel 7 and the rear wheel 10 in the state shown in FIG. 8(2) and FIG. 9. Then, as shown in FIG. 8(3), the front wheel 7 is steered leftward by a steering angle θ1 during the left turn. In the state shown in FIG. 9, since the contact point between the rear wheel 10 and the ground 100 has moved from A1 to A2, the loading direction of the weighted center G (the direction of the arrow B) does not pass through the torsion axis L1. Thus, assuming that the load of the weighted center is F [N] and the distance from the line Lg connecting the contact point A2 between the rear wheel 10 and the ground 100 to the extension line of the torsion axis L1 is r [m], then a moment of M=F*r[N·m] is produced about the torsion axis L1. This moment causes the main frame 3 (see FIG. 2) to rotate as if to fall outward (leftward) about the torsion axis L1. In this case, as the rear wheel 10 is inclined (rotated) leftward about the torsion axis L1 extending obliquely rearward and downward, the vehicle body is subjected to torsion and the rear wheel 10 is steered rightward slightly by a steering angle 02, as shown in FIG. 8(3). This can increase the angle between the center axis C1 of the rotation of the front wheel 7 and the center axis C2 of the rotation of the rear wheel 10, thereby reducing the turning radius. As a result, the turning characteristics can be improved. That is, the turning radius can be reduced by the steering angle θ2 and camber thrust applied to the rear wheel 10.

Now, description is made of the operation of the conventional motorcycle, in which the head pipe is coupled to the main frame so as not to be rotatable, as a comparative example. When the conventional motorcycle of FIG. 10(1) is about to make a left turn, for example, the vehicle body is inclined leftward with respect to the vertical direction, as shown in FIG. 10(2). Then, in FIG. 10(3), the front wheel 7 is steered leftward by a steering angle θ3 during the left turn. Since the head pipe is coupled to the main frame so as not to be rotatable in the conventional motorcycle as a comparative example, the rear wheel 10 rotates about the line connecting the contact point between the front wheel 7 and the ground 100 and the contact point between the rear wheel 10 and the ground 100. This results in the front and rear sides of the rear wheel 10 being in the same positional relationship (with a steering angle of 0 degrees) with respect to the width direction of the motorcycle, which leaves the center axis C12 of the rotation of the rear wheel 10 in the direction perpendicular to the running direction. Thus, the angle between the center axis C11 of the rotation of the front wheel 7 and the center axis C12 of the rotation of the rear wheel 10 is smaller than that in the embodiment of the present invention described above. Consequently, the turning radius of the conventional motorcycle as a comparative example is larger than that of the embodiment of the present invention described above.

Figure 11:
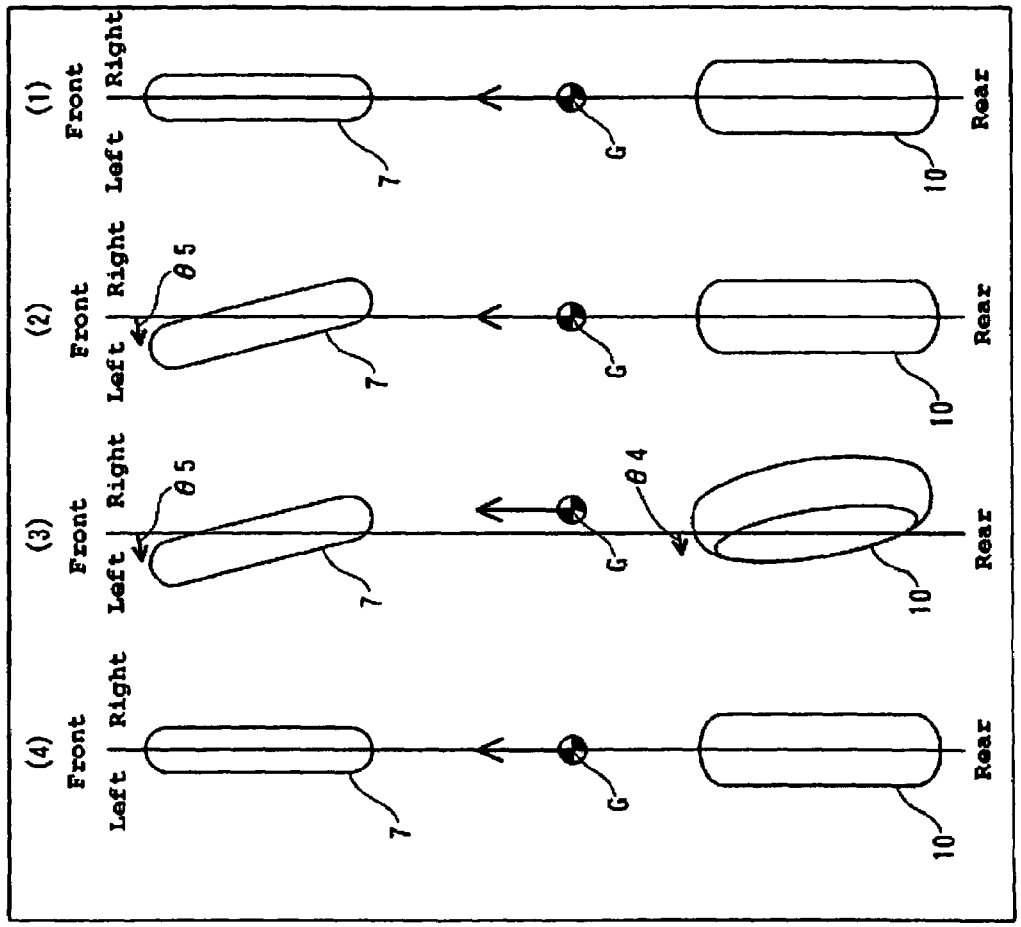
FIG. 11 illustrates the operation of the motorcycle according to the embodiment shown in FIG. 1 while running straight ahead, in which operation the head pipe rotates with respect to the main frame.
Figure 12:
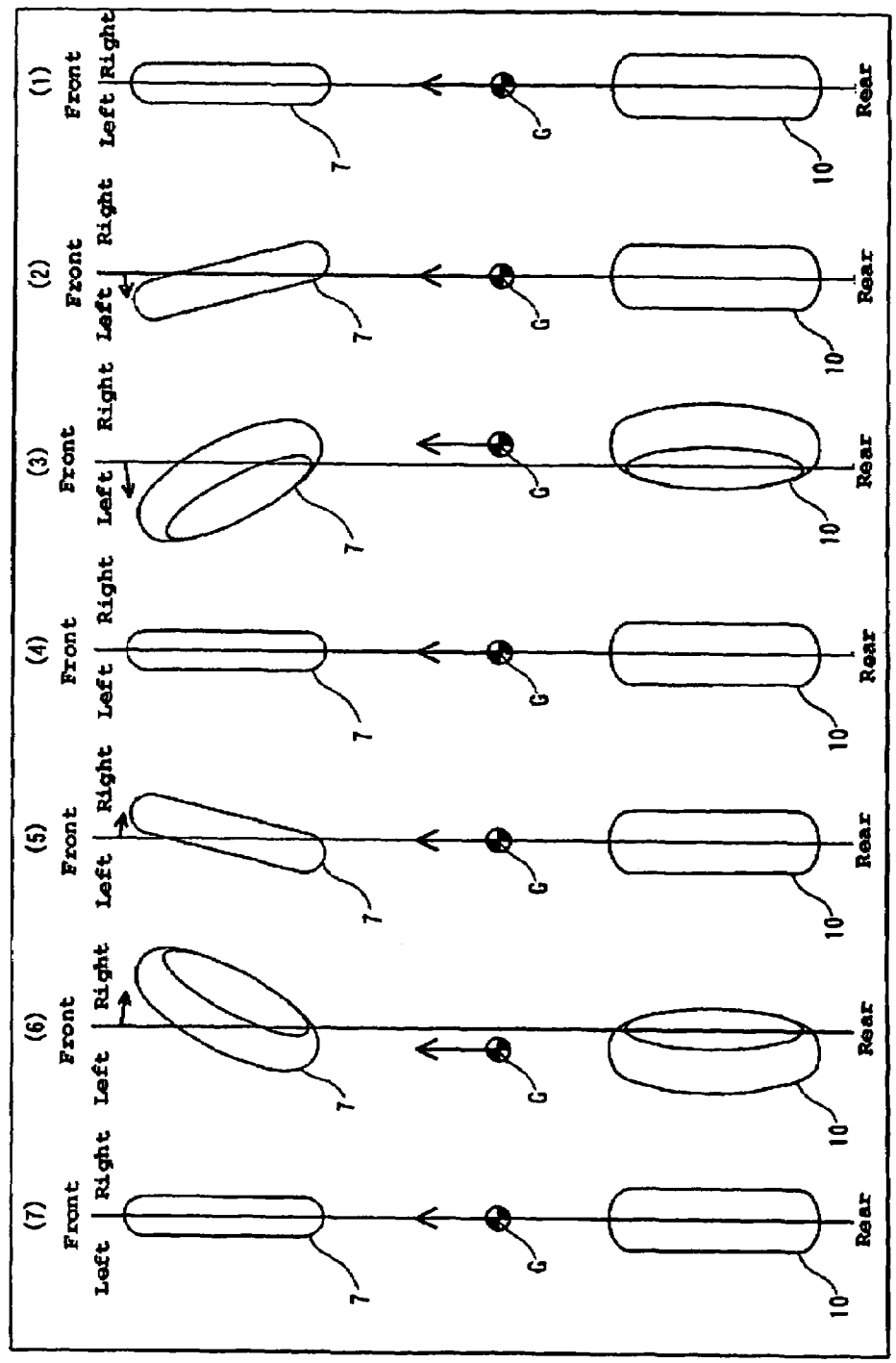
FIG. 12 illustrates the operation of the conventional motorcycle corresponding to FIG. 11, as a comparative example of the embodiment shown in FIG. 1.

FIG. 11 illustrates the operation of the motorcycle according to the embodiment shown in FIG. 1 while running straight ahead, in which operation the head pipe rotates with respect to the main frame. FIG. 12 illustrates the operation of the conventional motorcycle corresponding to FIG. 11, as a comparative example of the embodiment shown in FIG. 1. Now, with reference to FIGS. 2, 11 and 12, description is made of the operation of the motorcycle according to the embodiment of the present invention while running straight ahead and another operation of the motorcycle according to the comparative example.

Normally, when a motorcycle reaches a certain speed, its front wheel occasionally vibrates sympathetically. In this case, the front wheel is steered left and right, and the handlebars feel unstable. The present invention has an effect of converging the steering angle. It is assumed that the front wheel 7 of the motorcycle 1 is directed obliquely leftward and forward with respect to the moving direction for some reason, as shown in FIG. 11(2), while the motorcycle 1 according to this embodiment is running straight ahead as shown in FIG. 11(1). At this time, the weighted center G of the motorcycle 1 acts straight ahead (forward in FIG. 11(2)) by inertial force. In this case, the rear wheel 10 receives force which urges it to rotate outward (rightward) with respect to the front wheel 7, which is directed obliquely leftward and forward. Here, since the weighted center G of the motorcycle 1 is positioned above the extension line of the torsion axis L1 (see FIG. 2), the main frame 3 (see FIG. 2) and the rear wheel 10 rotate as if to fall outward (leftward) about the torsion axis L1. In this case, since the torsion axis L1 is disposed to extend obliquely rearward and downward from the head pipe 2 as shown in FIG. 1, when the main frame 3 and the rear wheel 10 rotate rightward about the torsion axis L1, the rear wheel 10 is steered obliquely leftward by a steering angle θ4 with respect to the moving direction, as shown in FIG. 11(3). The obliquely leftward steering angle θ4 of the rear wheel 10 is smaller than the obliquely leftward steering angle θ5 of the front wheel 7. This causes the driving force of the rear wheel 10 to act on the left side of the contact point between the front wheel 7 and the ground 100. Therefore, rightward turning force acts on the vehicle body, allowing not only the front wheel 7 but also the rear wheel 10 to be directed straight ahead so that the vehicle moves straight ahead. However, after the state shown in FIG. 11(4), the vehicle is steered rightward by the sympathetic vibration as described above. After steered rightward, the vehicle behaves in the same way as when steered leftward by the steering angle θ5 as described above and moves straight ahead as the steering angles are converged.

Now, description is made of the operation of the conventional motorcycle, in which the head pipe is coupled to the main frame so as not to be rotatable, as a comparative example. When the front wheel 7 (head pipe) of the motorcycle is directed obliquely leftward and forward, for example, with respect to the moving direction as shown in FIG. 12(2) while the motorcycle is running straight ahead as shown in FIG. 12(1), the weighted center G of the motorcycle acts in the direction of running straight ahead (forward in FIG. 12(2)) by inertial force. In this case, the rear wheel 10 receives force which urges it to be inclined outward (rightward) with respect to the front wheel 7 which is directed obliquely leftward and forward. Since the head pipe is coupled to the main frame so as not to be rotatable, the main frame and the rear wheel 10 rotate as if to fall outward (rightward) about the line connecting the contact point between the front wheel 7 and the ground 100 and the contact point between the rear wheel 10 and the ground 100. Also at this time, since the main frame is coupled to the head pipe so as not to be rotatable, the ground contact point of the front wheel 7 deviates leftward from the center of the vehicle. This causes the driving force of the rear wheel 10 to act on the right side of the contact point between the front wheel 7 and the ground 100, which directs the front wheel 7 further leftward with respect to the moving direction compared to the state shown in FIG. 12(2). This urges the vehicle body to fall further rightward as shown in FIG. 12(3), which produces a gyro moment on the front wheel 7 due to a gyro effect. Consequently, the front wheel 7 is directed straight ahead as shown in FIG. 12(4), and then directed obliquely rightward and forward with respect to the moving direction as shown in FIG. 12(5). When the front wheel 7 is directed obliquely rightward and forward with respect to the moving direction, the weighted center G of the motorcycle acts straight ahead (forward in FIG. 12(5)) by inertial force. In this case, the rear wheel 10 receives force which urges it to be inclined outward (leftward) with respect to the front wheel 7 which is directed obliquely rightward and forward. Since the head pipe is coupled to the main frame so as not to be rotatable, the main frame and the rear wheel 10 rotate as if to fall outward (leftward) about the line connecting the contact point between the front wheel 7 and the ground 100 and the contact point between the rear wheel 10 and the ground 100. Also, at this time, since the main frame is coupled to the head pipe so as not to be rotatable, the contact point of the front wheel 7 with the ground deviates rightward from the center of the vehicle. This causes the driving force of the rear wheel 10 to act on the left side of the contact point between the front wheel 7 and the ground 100, which directs the front wheel 7 further rightward with respect to the moving direction compared to the state shown in FIG. 12(5). This urges the vehicle body to fall further leftward as shown in FIG. 12(6), which produces a gyro moment on the front wheel 7 due to a gyro effect. Consequently, the front wheel 7 is directed straight ahead as shown in FIG. 12(7), and then directed obliquely rightward and forward with respect to the moving direction as shown in FIG. 12(2). As described above, when the front wheel 7 of the conventional motorcycle is urged leftward or rightward with respect to the moving direction for some reason, the front wheel 7 is liable to be directed leftward or rightward with respect to the moving direction compared to the embodiment described above, and can occasionally be vibrated (sympathetically) leftward and rightward to a great degree.

As described above, this embodiment is provided with the main frame 3 to which the head pipe 2 is attached for rotation about the torsion axis L1 of the shaft portion 2a extending longitudinally, and the torsion spring 13 for absorbing shock as the head pipe 2 rotates with respect to the main frame 3. Thus, the head pipe 2 can be rotated with respect to the main frame 3 such that the front wheel 7 moves in the vehicle width direction to conform to bumps and potholes on the ground 100 during turns with the vehicle body inclined, and the torsion spring 13 can actively absorb shock in the vehicle width direction (lateral direction) with its torsion force during such rotations. As a result, shock applied in the vehicle width direction (lateral direction) due to bumps and potholes on the ground 100 can be sufficiently absorbed.

In this embodiment, when the front wheel 7 and the rear wheel 10 are in an identical plane, the torsion spring 13 is unloaded (the torsion angle is 0 degrees), and when the front wheel 7 and the rear wheel 10 are not in an identical plane with the head pipe 2 rotated with respect to the main frame 3, the torsion spring 13 is loaded to absorb shock with its torsion force. Thus, the torsion spring 13 can easily absorb shock with its torsion force when the front wheel 7 and the rear wheel 10 are not in an identical plane with the head pipe 2 rotated with respect to the main frame 3.

In this embodiment, the extension line of the torsion axis L1 of the shaft part 2a extending longitudinally passes near the contact point between the rear wheel 10 and the ground 100. Thus, when the main frame 3 rotates with respect to the head pipe 2, the rear wheel 10 rotates about the vicinity of the contact point between the rear wheel 10 and the ground 100, thereby inhibiting the rear wheel 10 from skidding with respect to the ground 100.

In one aspect, this embodiment is provided with the angular bearing 9 for supporting the head pipe 2 and the main frame 3 for rotation with respect to each other. The angular bearing 9 allows the head pipe 2 to be smoothly rotated with respect to the main frame 3 about the torsion axis L1 of the shaft part 2a extending longitudinally. The angular bearing 9 can also assure the rigidity of the part, where the head pipe 2 and the main frame 3 are coupled, both in the direction along the torsion axis L1 extending longitudinally (thrust direction) and in the direction perpendicular to the torsion axis L1 extending longitudinally (radial direction).

This embodiment is provided with the pair of stoppers 17 for restricting rotation of the head pipe 2 with respect to the main frame 3, thereby preventing the head pipe 2 from excessively rotating with respect to the main frame 3.

In this embodiment, the engine 22 is mounted to the main frame 3 for supporting the rear wheel 10, and the rear wheel 10 can be inclined, together with the main frame 3 and the engine 22, with respect to the vertical direction during turns. Thus, since the rear wheel 10 is inclined together with the engine 22 which is heavy, the weighted center G of the vehicle body can be moved leftward and rightward (in the vehicle width direction) with respect to the moving direction easily by inclining the rear wheel 10. This can improve the turning characteristics of the motorcycle 1.

It should be noted that the embodiment disclosed herein is for illustration purposes in all respects, rather than a limitation. The scope of the present invention is not defined by the description of the above embodiment but defined by the scope of the appended claims, and includes any modifications which fall within the meaning and the scope equivalent to those of the appended claims.

For example, the above embodiment uses a motorcycle as an example of the vehicle. However, the present invention is not limited thereto, but is also applicable to other types of vehicles provided with a head pipe and a body frame, such as bicycles, three-wheelers, and ATVs (All Terrain Vehicles).

Figure 13:
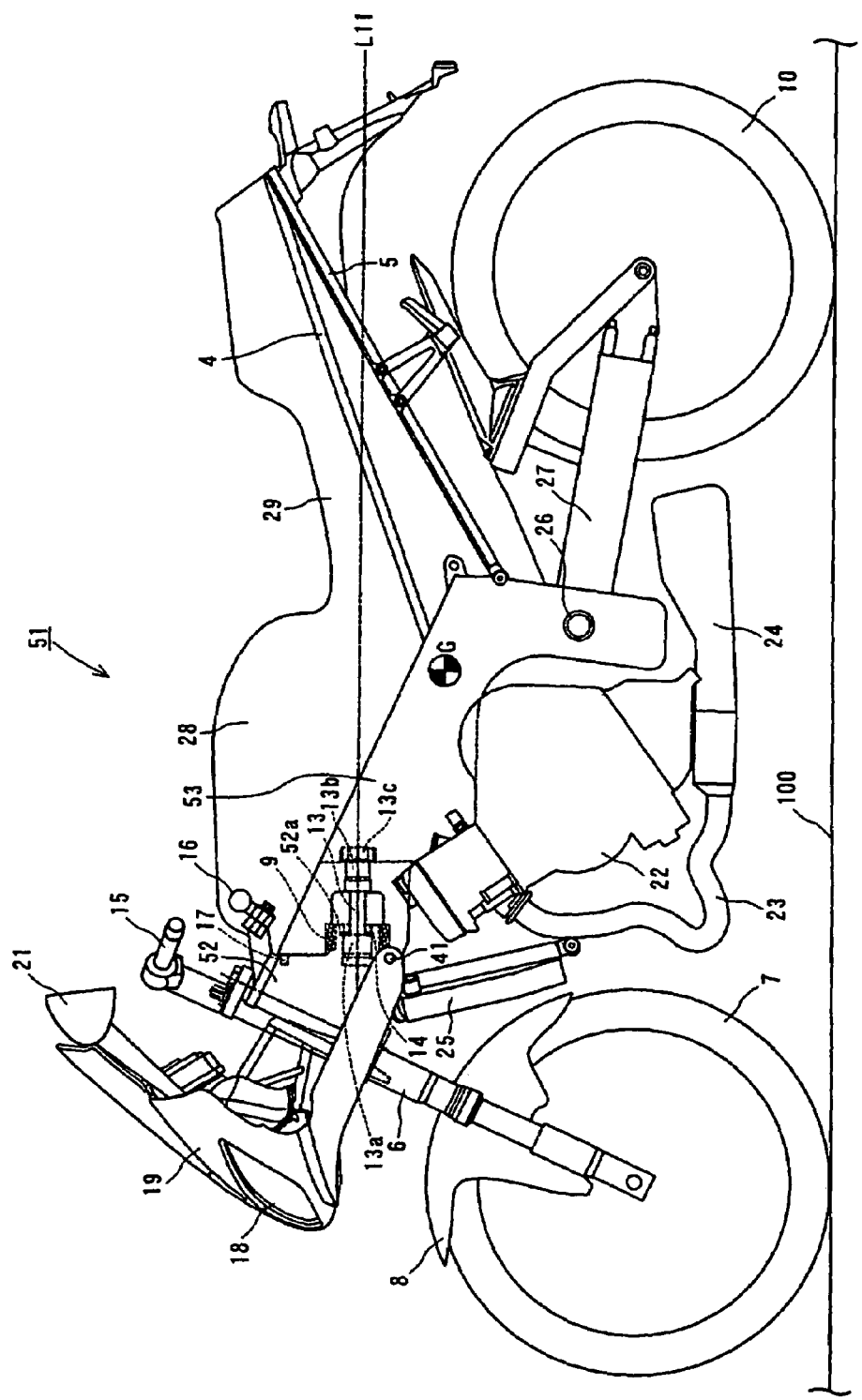
FIG. 13 is a side view showing the entire structure of a motorcycle according to a modified embodiment of the present invention.

In the above embodiment, the torsion axis of the shaft part of the head pipe extends rearward and downward and passes near the contact point between the rear wheel and the ground. However, the present invention is not limited thereto, but the torsion axis of the shaft part of the head pipe may extend rearward and downward but not pass near the contact point between the rear wheel and the ground. Alternatively, as shown in FIG. 13 showing the motorcycle 51 as a modified embodiment, the torsion axis L11 of the shaft part 52a of the head pipe 52 may extend horizontally rearward, and the shaft part 52a of the head pipe 52 and the main frame 53 may be formed such that the torsion spring 13 extends horizontally rearward.

The above embodiment uses the reciprocating cylinder type damper as an example of the damping means for damping vibration of the torsion spring as the head pipe rotates with respect to the main frame. However, the present invention is not limited thereto, but a rotary damper which moves in an arc coaxially with the torsion spring may be used. The present invention may not be provided with any member for damping vibration of the torsion spring as the head pipe rotates with respect to the main frame.

The above embodiment is provided with the torsion spring as an example of the shock absorbing member for absorbing shock as the head pipe rotates with respect to the main frame. However, the present invention is not limited thereto, but a member other than the torsion spring may be provided as the shock absorbing member for absorbing shock as the head pipe rotates with respect to the main frame.

The above embodiment uses the angular bearing to support the head pipe and the main frame for rotation with respect to each other. However, the present invention is not limited thereto, but may use other types of bearings, such as a taper roller bearing, to support the head pipe and the main frame for rotation with respect to each other.

The invention claimed is:

1. A vehicle comprising:
   a front frame including a head pipe for supporting a front wheel, wherein a first bearing attachment part projects downward and rearward from an upper part of the head pipe;
   a rear frame for supporting a rear wheel, and including a second bearing attachment part to which the first bearing attachment part of the head pipe is attached for rotation about an axis extending longitudinally;
   a shock absorbing member for absorbing shock as the front frame rotates with respect to the rear frame; and
   damping means for damping rotation of the front frame with respect to the rear frame comprising:
      a damper support part formed integrally with the upper part of the head pipe and extending obliquely rearward and upward; and
      a hydraulic cylinder damper attached to the upper part of the damper support part.

2. The vehicle according to claim 1, wherein the shock absorbing member includes a torsion spring disposed between the front frame and the rear frame and on the axis extending longitudinally.

3. The vehicle according to claim 2, wherein a front part of the torsion spring is secured to the front frame, and a rear part of the torsion spring is secured to the rear frame.

4. The vehicle according to claim 2, wherein the torsion spring is unloaded when the front wheel and the rear wheel are in an identical plane, and the torsion spring is loaded to absorb shock with its torsion force when the front frame and the rear frame are in different planes with the front frame rotated with respect to the rear frame.

5. The vehicle according to claim 1, wherein an extension line of the axis extending longitudinally passes through a contact point between the rear wheel and the ground.

6. The vehicle according to claim 1, further comprising a bearing for supporting the front frame and the rear frame for rotation with respect to each other, the bearing being disposed between the front frame and the rear frame.

7. The vehicle according to claim 6, wherein the bearing is an angular bearing.

8. The vehicle according to claim 7, wherein the first bearing attachment part has a rotation center on the axis extending longitudinally and an outer circumferential surface to which the angular bearing is attached, and the second bearing attachment part is disposed to oppose the first bearing attachment part of the head pipe and has an inner circumferential surface to which the angular bearing is attached.

9. The vehicle according to claim 1, wherein the vehicle's weighted center is positioned anywhere other than on the extension line of the axis extending longitudinally.

10. The vehicle according to claim 1, wherein the axis extending longitudinally extends rearward and downward of the front frame.

11. The vehicle according to claim 1, further comprising a restricting member for restricting rotation of the front frame with respect to the rear frame.

12. The vehicle according to claim 1, further comprising a front light disposed forward of the front frame, the front light being secured to the rear frame.

13. The vehicle according to claim 1, wherein an engine is mounted to the rear frame for supporting the rear wheel, and the rear wheel can be inclined together with the rear frame and the engine with respect to a vertical direction during a turn.

14. The vehicle according to claim 1, wherein the first bearing attachment part is a cylindrical shaft part formed integrally with the head pipe, and the second bearing attachment part is a recessed shaft insertion part for receiving the cylindrical shaft part of the head pipe.

15. The vehicle according to claim 1, wherein the hydraulic cylinder damper comprises:
   a tank part secured to the damper support part and filled with oil;
   a piston disposed within the tank part and having an orifice allowing the oil to pass therethrough; and
   a piston shaft secured to the piston and penetrating through the tank part; and
   a piston shaft support part ball-jointed to an end of the piston shaft,
   wherein arcuate rotational movement of the head pipe with respect to the rear frame is converted to linear movement of the piston and piston shaft in the tank part.

16. The vehicle according to claim 11, wherein the restricting member comprises stoppers provided on the rear frame that contact the head pipe when the head pipe rotates with respect to the axis extending longitudinally.

17. The vehicle according to claim 1, wherein the first and second bearing attachment parts are disposed forward of an engine of the vehicle.

18. The vehicle according to claim 1, wherein the first and second bearing attachment parts are disposed forward of a seat of the vehicle.

* * * * *